United States Patent
Pinho et al.

(10) Patent No.: US 11,647,103 B1
(45) Date of Patent: May 9, 2023

(54) COMPRESSION-AS-A-SERVICE FOR DATA TRANSMISSIONS

(71) Applicant: Dell Products L.P., Round Rock, TX (US)

(72) Inventors: Rômulo Teixeira De Abreu Pinho, Niterói (BR); Vinicius Michel Gottin, Rio de Janeiro (BR); Joel Christner, El Dorado Hills, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/648,000

(22) Filed: Jan. 14, 2022

(51) Int. Cl.
*H04L 69/04* (2022.01)
*H03M 7/30* (2006.01)
*H04L 9/40* (2022.01)

(52) U.S. Cl.
CPC .............. *H04L 69/04* (2013.01); *H03M 7/30* (2013.01); *H04L 63/0428* (2013.01)

(58) Field of Classification Search
None
See application file for complete search history.

(56) References Cited

U.S. PATENT DOCUMENTS

| | | |
|---|---|---|
| 9,450,603 B2 | 9/2016 | Dickie |
| 9,503,123 B1 | 11/2016 | Pinho et al. |
| 9,558,566 B2 | 1/2017 | Charikar et al. |
| 9,660,666 B1 | 5/2017 | Ciarlini et al. |
| 9,898,375 B1 | 2/2018 | Fricker |
| 9,935,652 B1 | 4/2018 | Chalmer et al. |
| 9,954,550 B1 | 4/2018 | Ciarlini et al. |
| 9,973,210 B1 | 5/2018 | Mahony et al. |
| 10,044,370 B1 | 8/2018 | Pasha. B. K. |
| 10,103,745 B1 | 10/2018 | Rodrigues et al. |
| 10,122,379 B1 | 11/2018 | Ciarlini et al. |
| 10,133,551 B1 | 11/2018 | Ciarlini et al. |
| 10,153,779 B1 | 12/2018 | Bordignon et al. |
| 10,169,359 B1 | 1/2019 | Pinho et al. |
| 10,200,060 B1 | 2/2019 | Ciarlini et al. |
| 10,235,134 B1 | 3/2019 | Dangi et al. |
| 10,452,616 B1 | 10/2019 | Bassov |
| 10,505,563 B1 | 12/2019 | Gonczi |
| 10,509,676 B1 | 12/2019 | Bassov |
| 10,585,856 B1 | 3/2020 | Bigman |
| 10,666,289 B1 | 5/2020 | Sofia et al. |
| 10,749,546 B1 | 8/2020 | Sun |
| 10,762,667 B2 | 9/2020 | Mekuria |
| 11,068,405 B2 | 7/2021 | Armangau et al. |

(Continued)

OTHER PUBLICATIONS

Kooten, P. van. (2019). shrynk—Using Machine Learning to learn how to Compress. Retrieved Dec. 11, 2019, from https://vks.ai/2019-12-05-shrynk-using-machine-learning-to-learn-how-to-compress.

(Continued)

*Primary Examiner* — Quang N Nguyen
(74) *Attorney, Agent, or Firm* — Workman Nydegger

(57) ABSTRACT

A compression system is disclosed. A compression service removes compression responsibilities from an application. The compression system can deploy virtual network engines to locations near the applications. The virtual network engines compress the data using a compressor selected from multiple compressors. The compressed data can then be transmitted, decompressed, and delivered to the destination.

16 Claims, 4 Drawing Sheets

(56) References Cited

U.S. PATENT DOCUMENTS

| | | | |
|---|---|---|---|
| 2005/0265585 | A1 | 12/2005 | Rowe |
| 2005/0265586 | A1 | 12/2005 | Rowe et al. |
| 2005/0271258 | A1 | 12/2005 | Rowe |
| 2011/0163163 | A1 | 7/2011 | Rowe |
| 2014/0379866 | A1* | 12/2014 | Perlman .............. H04N 19/61 709/218 |
| 2015/0205992 | A1 | 7/2015 | Rowe |
| 2016/0014437 | A1* | 1/2016 | Perlman .............. A63F 13/77 463/31 |
| 2017/0235497 | A1 | 8/2017 | Shih |
| 2018/0067679 | A1 | 3/2018 | Adrianus et al. |
| 2018/0234110 | A1 | 8/2018 | Kaldewey |
| 2020/0134048 | A1 | 4/2020 | Faibish et al. |
| 2020/0341668 | A1 | 10/2020 | Gonczi |
| 2020/0341670 | A1 | 10/2020 | Zhang et al. |
| 2020/0348957 | A1 | 11/2020 | Krasner et al. |
| 2020/0348959 | A1 | 11/2020 | Krasner et al. |
| 2021/0027115 | A1 | 1/2021 | Davis et al. |
| 2021/0281491 | A1* | 9/2021 | Yelahanka Raghuprasad ............. G06N 3/0454 |
| 2022/0129190 | A1 | 4/2022 | Bassov |
| 2022/0294470 | A1* | 9/2022 | de Abreu Pinho ..... G06F 16/17 |

OTHER PUBLICATIONS

Murashko, O. (2018). *Using Machine Learning to Select and Optimise Multiple Objectives in Media Compression.* PhD Thesis. University of St Andrews. Retrieved from http://research-repository.st-andrews.ac.uk/.

Sneyers, J., & Wuille, P. (2016). *FLIF: Free lossless image format based on MANIAC compression.* In 2016 IEEE International Conference on Image Processing (ICIP) (pp. 66-70). IEEE.

Pinho et al; U.S. Appl. No. 17/305,112, filed Jun. 30, 2021.

Apache Pulsar, https://streamnative.io/en/blog/tech/2021-01-14-pulsar-architecture-performance-tuning/(accessed Jun. 2022).

Harwath, D., & Glass, J. (2015). Deep Multimodal Semantic Embeddings for Speech and Images. 237-244, 8 pages.

IBM-MQ, https://www.ibm.com/docs/en/ibm-mq/9.1?topic=applications-channel-compression-in-mq-classes-java (accessed, Jun. 2022).

J.-I. Gailly and M. Adler, "Gzip," 2003, 1 page.

Kafka, https://www.conduktor.io/kafka/kafka-message-compression (accessed Jun. 2022).

Lin, T. Y., Maire, M., Belongie, S., Hays, J., Perona, P., Ramanan, D., Dollar, P., & Zitnick, C. L. (2014). Microsoft COCO: Common objects in context. Lecture Notes in Computer Science (Including Subseries Lecture Notes in Artificial Intelligence and Lecture Notes in Bioinformatics), 8693 LNCS(Part 5), 740-755. 16. pages.

M. Isenburg and P. Alliez, "Compressing polygon mesh geometry with parallelogram prediction," in IEEE Visualization, 2002. VIS 2002., Nov. 2002, pp. 141-146., 6 pages.

M. Mahoney, "Paq8," 2007, 9 pages.

P. Lindstrom and M. Isenburg, "Fast and efficient compression of floating-point data." IEEE transactions on visualization and computer graphics, vol. 12, No. 5, pp. 1245-1250, 2006, 7 pages.

Palov, "7-zip is a file archiver with a high compression ratio," 2016, 2 pages.

RabbitMQ, https://www.rabbitmq.com/clustering-compression.html (accessed Jun. 2022).

Y. Collet, "Lz4," 2017, 12 pages.

Z. Tarantov, "Snappy," 2011, 2 pages.

* cited by examiner

COMPRESSION-AS-A-SERVICE FOR DATA TRANSMISSIONS

FIELD OF THE INVENTION

Embodiments of the present invention generally relate to data compression. More particularly, at least some embodiments of the invention relate to systems, hardware, software, computer-readable media, and methods for compression as a service.

BACKGROUND

Data compression is relevant and useful for a variety of reasons. When data compression is performed, data is compressed at the source and the compressed data is transmitted to the destination. The data may be decompressed at the destination. Compressing data can conserve bandwidth. If data is compressed to half of its original size, the data can potentially be transmitted twice as fast to its destination.

Compression, however, is only beneficial when performed efficiently. For example, if the process of compressing data adds substantial time to the overall transmission process, then compressing the data may not be beneficial or improve overall performance. Decompressing the data may also add to the overall transmission time.

Compression/decompression can also be impacted by the availability of compression algorithms because compressing data with any available compression algorithm may not be the best approach. However, rather than seeking the best compression algorithm for specific data, data compression is often performed using pre-defined or generic compression algorithms that are indiscriminately applied to the data prior to transmission.

When transmitting data to a destination, both the transmitting and receiving ends of the communication must agree on and install the necessary compression/decompression components. This can be difficult because this requires several compression algorithms to be available to the application or installed on the device where the application is deployed and compression is desired. The corresponding decompression algorithms must be available at the destination.

Compression/decompression can also require compute resources including processors and memory. It is possible that sufficient resources to efficiently schedule and perform compression/decompression processes in addition to efficiently performing ordinary workloads may not be available.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
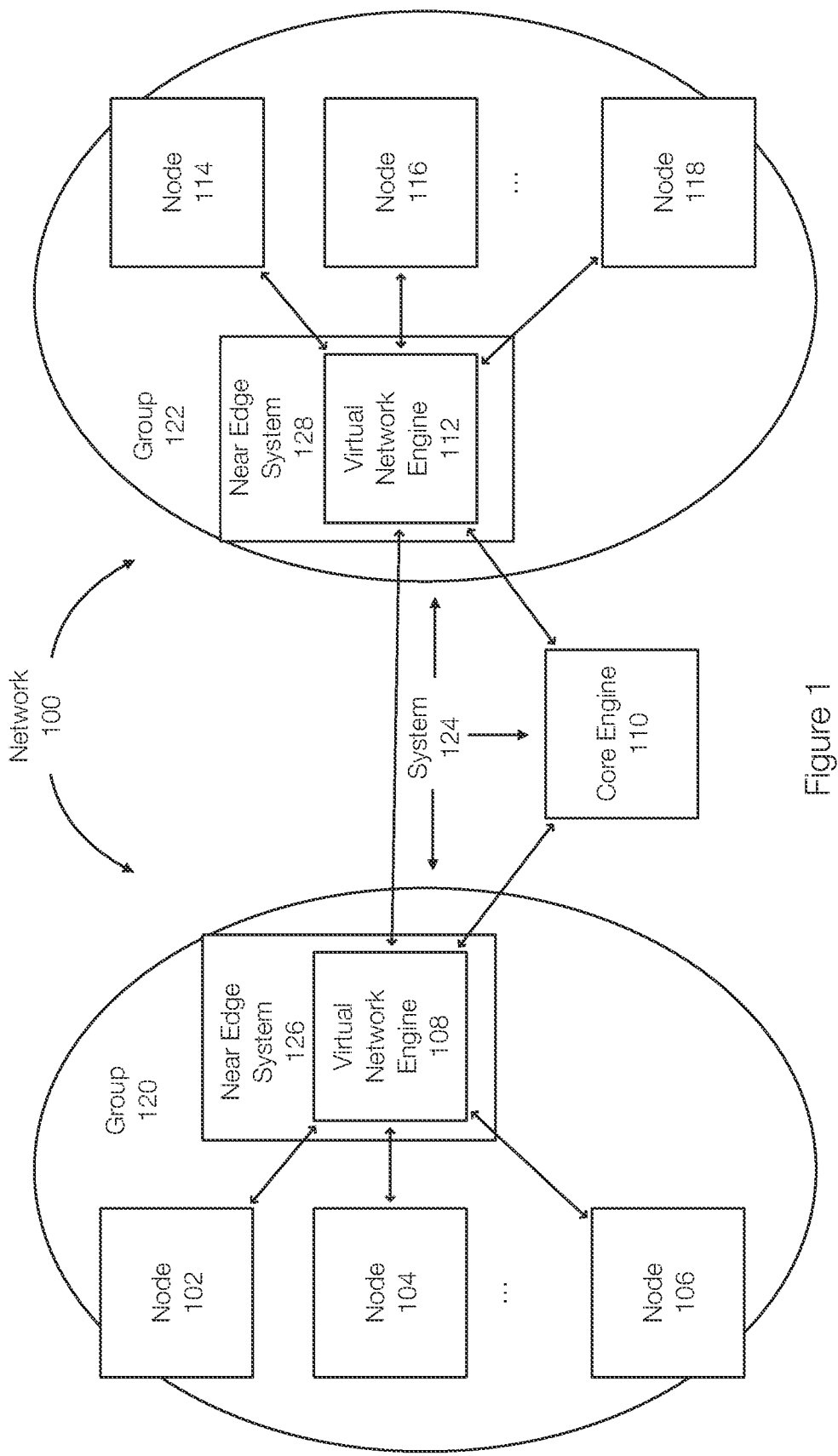
FIG. 1 discloses aspects of a compression system implemented in a computing network.

Embodiments of the present invention generally relate to data compression and data decompression. More particularly, at least some embodiments of the invention relate to systems, hardware, software, computer-readable media, and methods for providing compression as a service (COMPaaS).

Data compression and data decompression can provide several advantages. Compressing data, for example, can reduce network bandwidth requirements and may improve transmission performance. The performance improvement may depend on how much the data can be compressed—the compression ratio.

The effectiveness of a compression algorithm may depend on the content and context of the data. In fact, the best compressor for data can change according to content (characteristics of the data) and context (intended application). Compressors that are aware of the data type (e.g., audio, images, documents) have an understanding of the data and may achieve better compression ratios than generic compressors. When transferring data (e.g., from a source node to a remote node), higher compression ratios may improve the performance of the operations, particularly when the bandwidth is limited.

Compression is also beneficial when it does not add material time to the compression/decompression activities. As a result, selecting a compressor may also depend on the context. For example, data movement operations may consider compression and/or decompression speeds in addition to the data types the compressor has knowledge of when selecting a compressor. In some instances, compression may not be performed if efficiency or other service level agreement (SLA) requirements cannot be satisfied.

Consequently, the algorithm selected for specific data may depend on the content or characteristics of the data, the intended application or context, and SLA constraints.

Embodiments of the invention relate to an architecture or framework for providing compression as a service. Embodiments of the invention provide content, context, and/or SLA aware compression/decompression as a service that may be deployed in a network or other computing system. The framework includes a virtual network engine, which may by way of example be implemented as a virtual machine or container, that is configured to provide compression services to applications. The compression system operates independently of the application and is able to select a compression algorithm that satisfies content, context, and/or SLA constraints or other requirements. In addition, the compression system is decoupled from the applications that may benefit from data compression/decompression. The system provides flexibility and scalability to compression/decompression needs in computing networks.

Embodiments of the invention are discussed in the context of a compression system. However, the compression system disclosed herein may also perform data decompression. Thus, the compression system may be configured to perform data compression, data transmission, and/or data decompression.

FIG. 1 discloses aspects of a compression system deployed in a network. The network 100 in which a compression system 124 is deployed may include networks such as the Internet, telecommunication networks, local area networks, edge networks, near-edge networks, wide area networks, or the like or combinations thereof. FIG. 1 also illustrates groups, represented by groups 120 and 122.

Each of the groups 120 and 122 are, by way of example, groups of nodes that may be communicating with a near-edge system. For example, the nodes of the group 120, represented by nodes 102, 104, and 106, may communicate with the near edge system 126. The nodes of the group 122, represented by nodes 114, 116, and 118, may communicate with the near edge system 128. The near edge systems 126 and 128 may be part of the groups 120, and 122, respectively. The near edge systems 126 and 128 may be computing devices, servers, smartNICs (smart Network Interface Cards), or the like that include processors or other processing units, memory, and/or other networking hardware.

The compression system 124 may operate to compress and transfer data between a source node and a destination node that are in different groups. The compression system 124 may include a core engine 110 and virtual network engines, represented by virtual network engines 108 and 112. The virtual network engines 108 and 112 can be deployed as needed to the near edge systems 126 and 128 the core engine 110. The virtual network engines 108 and 112 may already be present at the near edge systems 126 and 128 prior to receiving a request for compression services.

Whenever the virtual network engines 108 and 112 are deployed by the core engine 110, the virtual network engines 108 and 112 are deployed based on knowledge the core engine 110 has about the destination network, such as the groups 120 and 122. Thus, the virtual network engine 108 is deployed to a location, such as the near edge system 126, that is near the nodes 102, 104 and 106. Similarly, the virtual network engine 112 is deployed to the near edge system 128, which is near to the nodes 114, 115, and 118. By way of example, nearness may be defined in terms of geography, network addresses, or the like.

In one example, the compression system 124 operates to compress data associated with a source, transmit the compressed data to a destination, and decompress the compressed data at the destination. For example, an application on the node 104 may need to use the compression services provided by the compression system 124. Once contacted by the application, the compression system 124 performs compression services. Thus, the compression services are removed from or abstracted the application and can be performed using resources other than those available to the application at the node. This helps prevent the compression services from interfering with other workloads at the node.

More specifically, the nodes 102, 104, and 106 are, by way of example, edge nodes and may be configured to run applications. Some of these applications may desire compression/decompression services. The virtual network engine 108 may be a virtual service and may operate as a virtual machine or a container in some examples. The virtual network engine 108 may be implemented in near edge infrastructure. If the nodes 102, 104, and 106 are edge nodes, the virtual network engine 108 may be a near edge device, but may also be implemented on a node or other location. The virtual network engine 108 may be a SmartNIC (smart Network interface card), a server, or other structure providing processing and networking capabilities.

The virtual network engine 108 may be configured with multiple compressors, each configured to perform a different compression algorithm. In one example, the virtual network engine 108 may be provided with all compression algorithms available in the compression system 124.

The virtual network engine 108 (and 112) may be configured to perform content based, context based, and SLA oriented compression operations. Performing content based, context based, and SLA oriented compression procedures are disclosed in U.S. Ser. No. 17/199,91 entitled PROBABILISTIC MODEL FOR FILE-SPECIFIC COMPRESSION SELECTION UNDER SLA-CONSTRAINTS and filed Mar. 12, 2021 and U.S. Ser. No. 17/305,112 entitled PROBABILISTIC MODEL FOR FILE-SPECIFIC COMPRESSION SELECTION UNDER SLA-CONSTRAINTS and filed Jun. 30, 2021, which are incorporated by reference in their entirety.

The compression mechanisms and compressor selection mechanisms are typically opaque to other components in the system including the requesting application. The virtual network engine 112 and nodes 114, 116, and 118 in the group 122 are similarly configured to the virtual network engine 108 and the nodes 102, 104, and 106 in the group 120 by way of example only.

Figure 2:
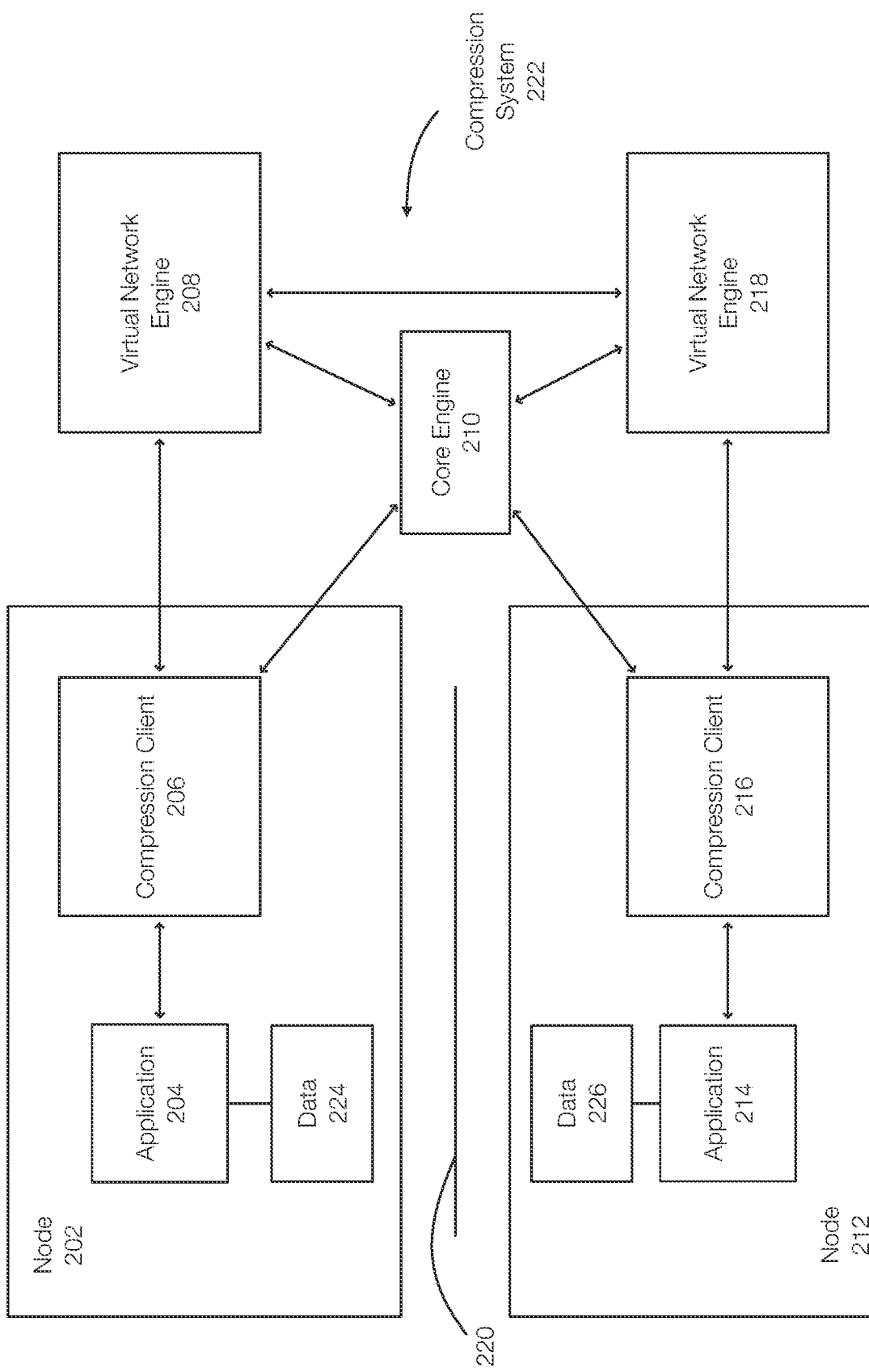
FIG. 2 discloses aspects of a compression system that performs compression related operations for compressing source data, transmitting the compressed data, and delivering decompressed data to a destination.

FIG. 2 discloses aspects of a compression system implemented in a network and illustrates communications that may occur with respect to the compression system. In this example, a source node 202 includes an application 204 and a compression client 206. The compression client 206 may be installed on the node 202. The compression client 206 can be deployed as needed and may be present only when performing compression services. The compression client 202 may be a localhost network service implementing an API (Application Programming Interface) that can be used by the application 204 to access the compression services provided by the compression system 222.

The compression client 206 receives requests from the application 204 to compress and transmit compressed data 224 to a destination, such as the node 212 where the data 224 will be stored as data 226. The data 226 may be stored in an uncompressed form or may remain in a compressed form. The node 212 may include an application 214 configured to receive the data 224, which may be stored as the data 226. The application 214 may be related to the application 204. For example, the application 204 may operate to perform data protection operations on data 224 stored at or accessible to the node 202 and the application 214 may be configured to store backups generated by the application 204. Thus, the data 224 is production data and the data 226 is backups of the production data. The compression client 206 also communicates with the virtual network engine 208 and the core engine 210.

The compression client 206 may expose functionality in the form of an API in one example. When the application 204 sends a request for compression services to the compression client 206, the request may take a form of Send (DestAddr, Data, SLA). This request, invoked by the application 204 (or other client) includes various parameters. The DestAddr parameter is the address of the destination of the data 224 to be transmitted once compressed. The Data parameter may be a universal resource identifier (URI) of the data 224 to be transmitted. The SLA parameter may include constraints to be satisfied by the compression operations performed by the compression system 222. The SLA parameter may indicate or include information about the compression ratio, compression throughput, decompression throughput, or the like. This information from the SLA parameter may be used in selecting a compressor for the identified data 224.

As previously stated, the virtual network engine 208 is deployed on an infrastructure element of the near edge relative to the node 202. The virtual network engine 208 includes multiple compressors and is responsible for implementing the requested compression services in accordance with the content, context, and SLA requirements. In one example, a compressor is selected from a plurality of candidate compressors using a small section or portion of the data to be compressed. The selected compressor satisfied the application-dependent SLA constraints provided by the application 204. More specifically, the compressor is selected based on one or more of the ability to conserve storage space/cost, speed of compression and/or decompression, cost of computation, overall time for data compression, data transmission, and data decompression, or the like or combination thereof.

The virtual network engine 908 may also provide or expose APIs. In one example, the compression client 206, after receiving a request from the application 204, invokes or calls an API associated with the virtual network engine 208.

The compression client 206 may invoke or include a function such as CompressSend(DestAddr, Data, SLA). This function compresses the data 224 identified by the application 204. The DestAddr parameter identifies the destination of the data 224. The Data parameter identifies the URI of the data to be compressed and transmitted and may include the actual data 224, which may be transmitted using a data transmission protocol. The SLA parameter indicates or identifies the SLA constraints relevant to the data 224.

The virtual network engine 208 (and 218) may also include a DecompressSend(DestAddr, CompData, Comp) function. This function is typically invoked by the transmitting virtual network engine 208. Thus, the virtual network engine 208 would invoke this function at the virtual network engine 218 in this example of compressing and transmitting the data 224.

The DestAddr parameter identifies the destination of the data being transmitted. The CompData parameter is the data compressed by the transmitting virtual network engine 208. The Comp parameter identifies the compression algorithm and associated compression parameters used in compressing the data 224.

In this example, the data 224 is compressed by the virtual network engine 208. The virtual network engine 208 transmits the compressed data to the virtual network engine 218. The virtual network engine 218 uses the parameters received from the virtual network engine 208 to decompress the data (if decompression is desired). The virtual network engine 218 can then provide the decompressed data to the compression client 216, which provides the decompressed data to the application 214. The decompressed data (or still compressed data) may be consumed or stored as the data 226. In another example, the virtual network engine 218 may be configured to write the decompressed data directly to storage associated with the node 212 or directly to the destination address.

In one embodiment, the virtual network engines 208 and 218 are implemented as virtual machines or containers. This provides flexibility and allows new compressors to be added without impacting the edge applications 204 and 214. Once the new compressors are added, the applications 204 and 214 benefit from the possibility of further improving data transmissions with the ability to use new compressors that may satisfy the relevant SLA constraints.

The core engine 210 is configured to manage the virtual network engines 208 and 218. More specifically, the core engine 2109 may control or deploy the virtual network engines 208 and 218. The core engine 210 may operate in the core or in the cloud (e.g., a datacenter). When applications, such as the applications 204 and 214 subscribe to the compression system 222, the compression clients 206 and 216 may be installed and are aware of how to access and communicate with the core engine 210.

The core engine 210 typically has access to virtual machine and/or container deployment and orchestration services and is also aware of the network topologies associated with the nodes 202 and 212. Thus, as groups are identified, group boundaries 220 can be identified or recognized. The compression system 222 may be used when transmitting data across group boundaries.

The core engine 210 may expose an API such as Req-COMPaaSVNS(Addr). This function receives a request to deploy a virtual network engine to a near edge group that is close to the requesting client. Thus, the Addr parameter may be an address of the edge node and the virtual network engine should be deployed to a location that is close to the provided address. Thus, the core engine 210 may receive a request to deploy a virtual network engine if a virtual network engine is not present. The core engine 210 returns the address of the virtual network engine in either case.

The core engine 210 may also track the virtual network engines that have been deployed. This allows the core engine 210 to automatically redeploy virtual network engine instances when necessary, such as in case of interruptions or hardware failure or for updates. In one example, a heartbeat approach may be used to determine the status of deployed virtual network engines.

Figure 3:
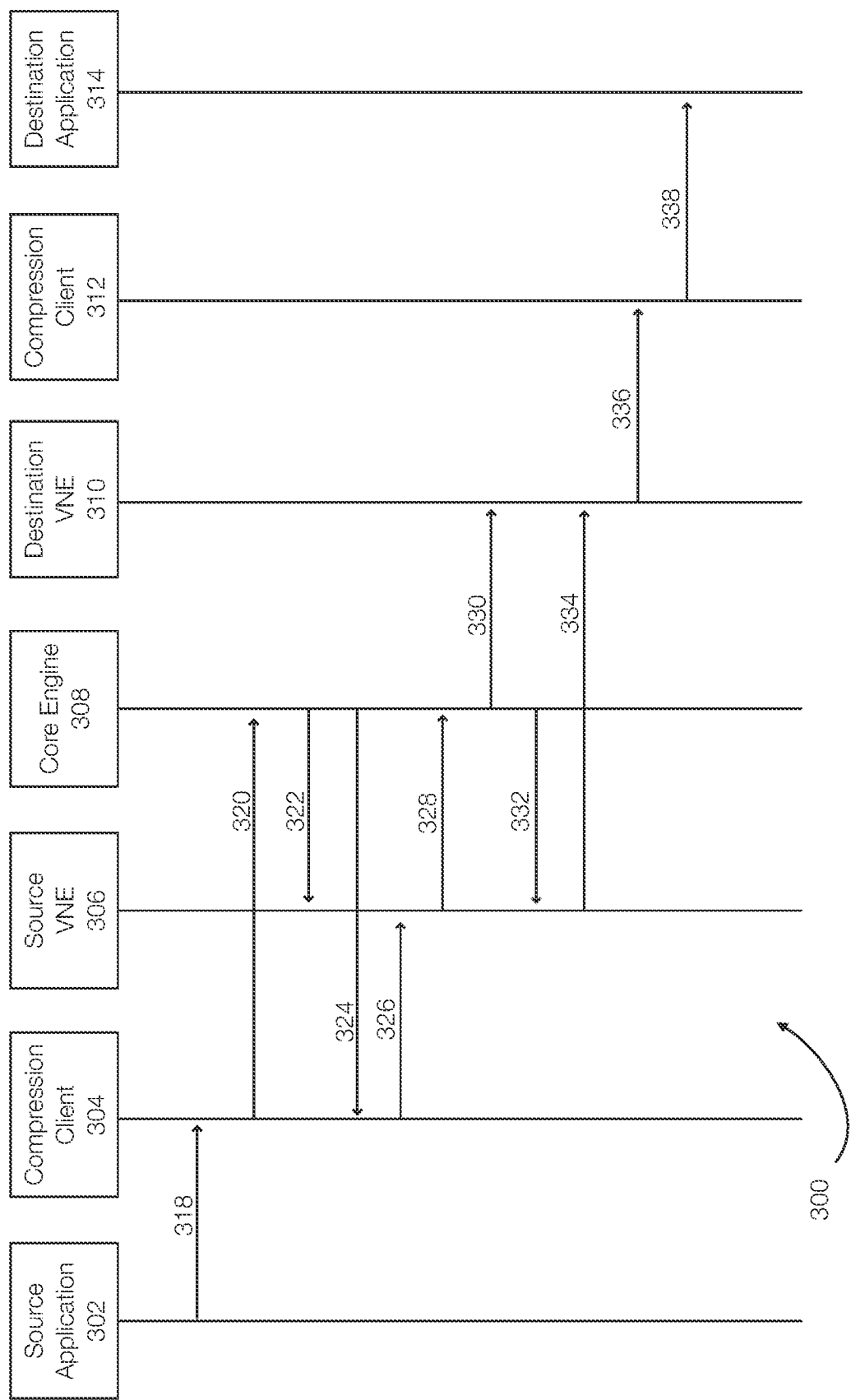
FIG. 3 discloses aspects of a method or protocol for performing compression related operations.

FIG. 3 discloses aspects of a method or protocol for performing compression and/or decompression services in a network. The method 300 may perform the compression/transmission/decompression using the APIs previously discussed. In one example, the process of transmitting data from a source to a destination begins when the source application 302 sends 318 a request to the source compression client 304. The compression client 304 then sends 320 a request to the core engine 308 to deploy a virtual network engine to a near edge location near a node on which the application 302 operates. The core engine 308 then deploys 322 a source virtual network engine 306 to the near edge location and provides an address to the compression client 304 (or other API caller). If the virtual network engine 306 is already present, the core engine 308 only needs to return 324 the address of the virtual network engine 306.

Once the compression client 304 has the address of the source virtual network engine 306, the compression client 304 sends a request (i.e., invokes an API) to compress and send 326 compressed data to a destination. The compression client 304 may provide a URI to the data or send the data to the virtual network engine 306. Before, during, or after receiving the data, the virtual network engine requests 328 the core engine 308 to deploy 330 a destination virtual network engine 310 to a location that is near the address of the destination. The core engine 308 may return 332 the address of the virtual network engine 310 to the virtual network engine 306.

Once the source virtual network engine 306 has the address of the destination virtual network engine 310, the virtual network engine 306 understands that the compressed data can be transmitted and decompressed at the virtual network engine 310. The virtual network engine selects a compressor for the data, compresses the data and sends 334 the compressed data to the virtual network engine 310.

The virtual network engine 310 can decompress the data using the decompressor associated with the compressor identified in the API call by the virtual network engine 306. The virtual network engine 310 may send 336 the decompressed data to the compression client 312 such that the decompressed data arrives 338 at the destination and is ready for use by the destination application 314.

Although embodiments of the invention are discussed in which the application 302 and compression client 304 are on the same node, this is not a requirement. The compression client 304 may be located on another node in the same group in other embodiments. Further, embodiments of the invention may be used within the same group rather than across groups as described in the method 300. However, the method may not be performed intragroup due to the compression/decompression overhead requirements.

Embodiments of the invention thus relate to a compression service to provide compression functionality for data transmissions. The need for applications to compile, link to or install compressors is removed. Application do not need to understand or know anything about the compressors. The compression system transparently and independently chooses the best compression algorithm for the data to be transmitted while satisfying SLA constraints. Applications also benefit automatically from new compressors that may be added to the compression service.

The components of the compression service (the compression client, the virtual network engine, and the core engine) can communicate amongst themselves and with edge applications and enable the instantiation, deployment, and use of compression services across the edge. In addition to facilitating the orchestration of compression services, the compression service allows nodes to access content and context-aware compression without incurring the computational costs of performing the compression themselves. The compression service also provides a communication protocol that allows edge applications to transparently benefit from content and context aware compression in data transmission.

Embodiments of the invention allow users or applications to align system behavior with desired outcomes. For example, certain types of data can be compressed without concern over compression time (to minimize transmission size), while other types of data can be compressed quickly (potentially lower compression ratios, but less latency added to the transmission). Certain types of data may not be compressed at all.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data compression/decompression operations which may include compression operations, decompression operations, transmission operations, deployment operations, compressor selection operations, or the like or combination thereof. More generally, the scope of the invention embraces any operating environment in which the disclosed concepts may be useful.

At least some embodiments of the invention provide for the implementation of the disclosed functionality in existing platforms, examples of which include the Dell-EMC NetWorker and Avamar platforms and associated backup software, and storage environments such as the Dell-EMC DataDomain storage environment. In general however, the scope of the invention is not limited to any particular data platform or data storage environment.

New and/or modified data collected and/or generated in connection with some embodiments, may be stored in a data environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter, an edge system, or the like.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, virtual machines (VM), or containers.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: receiving a request from an application to compress data, the application operating on a node, receiving the data at a source virtual network engine that has been deployed to a group that includes the node, compressing the data, by the source virtual network engine, transmitting the compressed data to a destination virtual network engine that has been deployed to a group that includes a destination, decompressing the compressed data at the destination virtual network engine, and delivering the decompressed data to the destination.

Embodiment 2. The method of embodiment 1, wherein the request includes parameters including an address of the destination, a resource identifier of the data, and service level agreement (SLA) constraints.

Embodiment 3. The method of embodiment 1 and/or 2, wherein the SLA constraints include one or more of compression speed, decompression speed, overall transmission time, cost of computation, and storage savings.

Embodiment 4. The method of embodiment 1, 2, and/or 3, further comprising selecting, by the source virtual network engine, a compressor, from amongst a plurality of compressors, that satisfies the SLA constraints.

Embodiment 5. The method of embodiment 1, 2, 3, and/or 4, further comprising deploying the source virtual network engine, by a core engine, in response to a request from a compressor client associated with the application.

Embodiment 6. The method of embodiment 1, 2, 3, 4, and/or 5, further comprising sending a request to the source virtual network engine, by the compressor client, wherein the request is associated with parameters including an address of the destination, the data or a resource identifier to the data, and SLA constraints.

Embodiment 7. The method of embodiment 1, 2, 3, 4, 5, and/or 6, wherein transmitting the compressed data includes sending a request to the destination virtual network engine from the source virtual network engine, the request including parameters including an address of the destination, the compressed data, and an identification of the compressor used to compress the data.

Embodiment 8. The method of embodiment 1, 2, 3, 4, 5, 6, and/or 7, further comprising deploying the destination virtual network engine, by a core engine, in response to a request from the source virtual network engine.

Embodiment 9. The method of embodiment 1, 2, 3, 4, 5, 6, 7, and/or 8, further comprising adding new compressors to the virtual network engine.

Embodiment 10. The method of embodiment 1, 2, 3, 4, 5, 6, 7, 8, and/or 9, wherein the virtual network engine comprises a virtual machine or a container and is deployed to a near edge location, wherein the virtual network engine further comprises a SmartNIC or a server.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
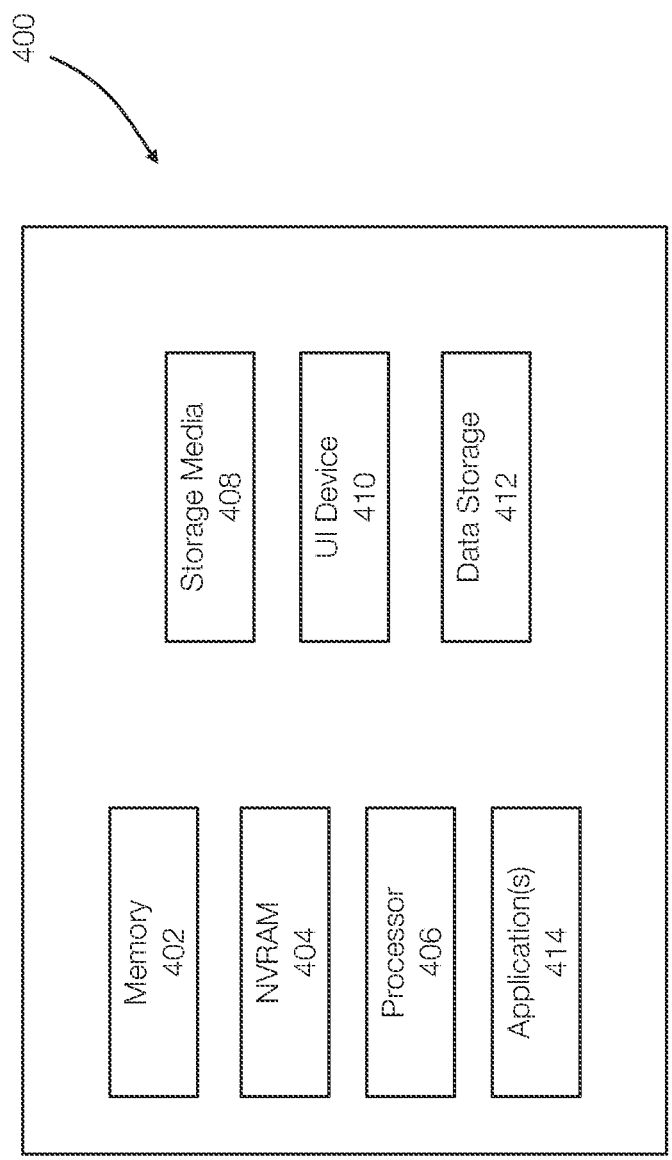
FIG. 4 discloses aspects of a computing system or environment.

With reference briefly now to FIG. 4, any one or more of the entities disclosed, or implied, by Figures, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving a request from an application to compress data, the application operating on a node, wherein the request includes parameters including an address of a destination, a resource identifier of the data, and service level agreement (SLA) constraints;
receiving the data at a source virtual network engine that has been deployed to a group that includes the node;
compressing the data, by the source virtual network engine, wherein the source virtual network engine selects a compressor, from amongst a plurality of compressors, that satisfies the SLA constraints, to compress the data;
transmitting the compressed data to a destination virtual network engine that has been deployed to a group that includes the destination;
decompressing the compressed data at the destination virtual network engine; and
delivering the decompressed data to the destination.

2. The method of claim 1, wherein the SLA constraints include one or more of compression speed, decompression speed, overall transmission time, cost of computation, and storage savings.

3. The method of claim 1, further comprising deploying the source virtual network engine, by a core engine, in response to a request from a compressor client associated with the application.

4. The method of claim 3, further comprising sending a request to the source virtual network engine, by the compressor client, wherein the request is associated with parameters including an address of the destination, the data or a resource identifier to the data, and SLA constraints.

5. The method of claim 1, wherein transmitting the compressed data includes sending a request to the destination virtual network engine from the source virtual network engine, the request including parameters including an address of the destination, the compressed data, and an identification of the compressor used to compress the data.

6. The method of claim 1, further comprising deploying the destination virtual network engine, by a core engine, in response to a request from the source virtual network engine.

7. The method of claim 1, further comprising adding new compressors to the virtual network engine.

8. The method of claim 1, wherein the virtual network engine comprises a virtual machine or a container and is deployed to a near edge location, wherein the virtual network engine further comprises a SmartNIC or a server.

9. A non-transitory storage medium having stored therein instructions that are executable by one or more hardware processors to perform operations comprising:
receiving a request from an application to compress data, the application operating on a node, wherein the request includes parameters including an address of a destination, a resource identifier of the data, and service level agreement (SLA) constraints;
receiving the data at a source virtual network engine that has been deployed to a group that includes the node;
compressing the data, by the source virtual network engine, wherein the source virtual network engine selects a compressor, from amongst a plurality of compressors, that satisfies the SLA constraints, to compress the data;
transmitting the compressed data to a destination virtual network engine that has been deployed to a group that includes the destination;
decompressing the compressed data at the destination virtual network engine; and
delivering the decompressed data to the destination.

10. The non-transitory storage medium of claim 9, wherein the SLA constraints include one or more of compression speed, decompression speed, overall transmission time, cost of computation, and storage savings.

11. The non-transitory storage medium of claim 9, further comprising deploying the source virtual network engine, by a core engine, in response to a request from a compressor client associated with the application.

12. The non-transitory storage medium of claim 11, further comprising sending a request to the source virtual network engine, by the compressor client, wherein the request is associated with parameters including an address of the destination, the data or a resource identifier to the data, and SLA constraints.

13. The non-transitory storage medium of claim 9, wherein transmitting the compressed data includes sending a request to the destination virtual network engine from the source virtual network engine, the request including parameters including an address of the destination, the compressed data, and an identification of the compressor used to compress the data.

14. The non-transitory storage medium of claim 9, further comprising deploying the destination virtual network engine, by a core engine, in response to a request from the source virtual network engine.

15. The non-transitory storage medium of claim 9, further comprising adding new compressors to the virtual network engine, wherein the virtual network engine comprises a virtual machine or a container and is deployed to a near edge location, wherein the virtual network engine further comprises a SmartNIC or a server.

16. A method, comprising:
  receiving a request from an application to compress data at a source virtual network engine, the application operating on a node and the source virtual network engine operating deployed to a location that allows the source virtual network engine to communicate with a group of nodes including the node, wherein the request includes parameters including an address of a destination, a resource identifier of the data, and service level agreement (SLA) constraints;
  receiving the data at the source virtual network engine;
  compressing the data, by the source virtual network engine, wherein the source virtual network engine selects a compressor from amongst a plurality of compressors, that satisfies the SLA constraints, to compress the data;
  transmitting the compressed data to a destination virtual network engine that has been deployed to a group that includes the destination;
  decompressing the compressed data at the destination virtual network engine; and
  delivering the decompressed data to the destination.

* * * * *